United States Patent
Du et al.

(10) Patent No.: US 9,794,952 B2
(45) Date of Patent: Oct. 17, 2017

(54) IMPLEMENTATION METHOD FOR TRANSMISSION-PRIORITY SEIZING OF LTE-BASED BROADBAND CLUSTER SYSTEM

(71) Applicants: Gaopeng Du, Shenzhen (CN); Qun Li, Shenzhen (CN); Zijiang Ma, Shenzhen (CN); Shouyong Zhang, Shenzhen (CN); Ding Ding, Shenzhen (CN)

(72) Inventors: Gaopeng Du, Shenzhen (CN); Qun Li, Shenzhen (CN); Zijiang Ma, Shenzhen (CN); Shouyong Zhang, Shenzhen (CN); Ding Ding, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 146 days.

(21) Appl. No.: 14/440,339

(22) PCT Filed: Sep. 17, 2013

(86) PCT No.: PCT/CN2013/083679
§ 371 (c)(1),
(2) Date: May 1, 2015

(87) PCT Pub. No.: WO2014/067357
PCT Pub. Date: May 8, 2014

(65) Prior Publication Data
US 2015/0282199 A1    Oct. 1, 2015

(30) Foreign Application Priority Data
Nov. 2, 2012  (CN) .......................... 2012 1 0433241

(51) Int. Cl.
H04H 20/71    (2008.01)
H04W 72/10   (2009.01)
(Continued)

(52) U.S. Cl.
CPC ............. *H04W 72/10* (2013.01); *H04W 4/06* (2013.01); *H04W 4/10* (2013.01); *H04W 74/04* (2013.01)

(58) Field of Classification Search
None
See application file for complete search history.

(56) References Cited

U.S. PATENT DOCUMENTS 7,983,199 B1 * 7/2011 Nguyen .............. H04L 65/4061
                                            370/260
2006/0126635 A1  6/2006 Alberth et al.
(Continued)

FOREIGN PATENT DOCUMENTS

CN        1852500       10/2006
CN       101242636       8/2008
(Continued)

OTHER PUBLICATIONS

International Search report mailed Dec. 26, 2013, from related international application No. PCT/CN2013/083679 (3 pages).
Japanese Office Action dated Apr. 26, 2016, from related patent application No. 2015-540028.
European Search Report on EP Pat. No. 13851032.6 dtd Aug. 4, 2015 (10 pages).

*Primary Examiner* — Chi H Pham
*Assistant Examiner* — Fahmida Chowdhury
(74) *Attorney, Agent, or Firm* — Foley & Lardner LLP (57) ABSTRACT

A method for implementing speaking right seizing of an LTE-based broadband cluster system, an MME, a network subsystem, a broadband wireless access subsystem and the LTE-based broadband cluster system are disclosed. The method includes: the broadband wireless access subsystem sending a trunking speaking right update request to the network subsystem, receiving trunking speaking right update accept message returned by the network subsystem, and sending the trunking speaking right update accept message to the speaking right seizing terminal; the broad- (Continued)

band wireless access subsystem, the network subsystem and the speaking right terminal interacting to complete a trunking speaking right context modification; and the broadband wireless access subsystem receiving speaking right occupation prompt message sent by the network subsystem, and sending trunking speaking right occupation prompt message to the speaking right terminal and the speaking right seizing terminal via a multicast control channel of an eMBMS and updating configuration information.

20 Claims, 5 Drawing Sheets

(51) Int. Cl.
*H04W 4/06* (2009.01)
*H04W 4/10* (2009.01)
*H04W 74/04* (2009.01)

(56) References Cited

U.S. PATENT DOCUMENTS

| 2012/0163204 A1* | 6/2012 | Oprescu-Surcobe ............. H04W 72/005 370/252 |
|---|---|---|
| 2012/0170502 A1 | 7/2012 | Korus et al. |

FOREIGN PATENT DOCUMENTS

| CN | 101299828 | 11/2008 |
|---|---|---|
| EP | 1 447 945 | 8/2004 |
| JP | 2008-510414 | 4/2008 |
| WO | WO-2006/019236 | 2/2006 |
| WO | WO-2008/054939 | 5/2008 |
| WO | WO-2011/097763 | 8/2011 |

\* cited by examiner

FIG. 1

```
┌─────────────────────────────────────────────────────────┐
│ The broadband wireless access subsystem sends a trunking speaking │
│ right update request to the network subsystem, receives a trunking │ 201
│ speaking right update accept message returned by the network │
│ subsystem, and sends the trunking speaking right update accept │
│ message to the speaking right seizing terminal │
└─────────────────────────────────────────────────────────┘
                              │
                              ▼
┌─────────────────────────────────────────────────────────┐
│ The broadband wireless access subsystem, the network subsystem │ 202
│ and the speaking right terminal interacts to complete a trunking │
│ speaking right context modification │
└─────────────────────────────────────────────────────────┘
                              │
                              ▼
┌─────────────────────────────────────────────────────────┐
│ The broadband wireless access subsystem receives speaking right │
│ occupation prompt message sent by the network subsystem, and │ 203
│ sends trunking speaking right occupation prompt message to the │
│ speaking right terminal and the speaking right seizing terminal via │
│ a multicast control channel of an eMBMS and │
│ updates configuration information │
└─────────────────────────────────────────────────────────┘
```

IMPLEMENTATION METHOD FOR TRANSMISSION-PRIORITY SEIZING OF LTE-BASED BROADBAND CLUSTER SYSTEM

CROSS-REFERENCE TO RELATED APPLICATIONS

The present application is a U.S. National Phase of International Patent Application No. PCT/CN2013/083679, filed Sep. 17, 2013, which claims priority from Chinese Patent Application No. 201210433241.6, tiled Nov. 2, 2012. The contents of these applications are incorporated herein by reference in their entirety.

TECHNICAL FIELD

The present document relates to the field of broadband digital trunking system, and particularly, to a method for implementing speaking right seizing of a Long Term Evolution (LTE)-based broadband trunking system, a Mobile Management Entity (MME), a network subsystem, a broadband wireless access subsystem and the LTE-based broadband trunking system.

BACKGROUND

With the development of the communication technology and the peoples' increasing insight into the trunking system, the trunking system as an efficient emergency command scheduling system plays a more and more important role. A trunking communication system is widely applied in the fields of government departments, public security, emergency communication, electric power, civil aviation, petrochemical industry and military and so on. The development of the trunking system goes through stages of a simulation trunking system and a narrowband digital trunking system, wherein many drawbacks exist in both the two stages of the trunking systems. The simulation trunking system has disadvantages of large interference, many dead zones and limited frequency and so on, and with regard to the narrowband digital trunking system, even though it has improvement on the communication quality and capacity relative to the simulation trunking system, it is still weak in the aspects of data transmission ability and support ability for multimedia services, moreover, the narrowband digital trunking system has certain difficulties in evolving to the LTE-based broadband digital trunking system.

At present, the LTE-based broadband digital trunking system has become a development direction of the next generation trunking system, the studies on the standards related to the LTE-based broadband digital trunking system are being carried out in China, and operators and enterprises wish to complete the deployment of the LTE-based broadband digital trunking system by performing corresponding modifications or extensions based on the current existing LTE network and technology, thus not only the existing LTE network and technology can be well utilized, but also the input costs are minimized for the operators and enterprises at the same time. Therefore, how to utilize the existing LTE network and technology to deploy architecture of the LTE-based broadband digital trunking system and to implement speaking right seizing of trunking services becomes a problem required to be solved urgently.

SUMMARY

The example of the present document provides a method for implementing speaking right seizing of an LTE-based broadband trunking system, an MME, a network subsystem, a broadband wireless access subsystem and the LTE-based broadband trunking system, to solve the problem of how to utilize the existing LTE network and technology to deploy a framework of the LTE-based broadband digital trunking system and to implement speaking right seizing of trunking services.

The example of the present document provides a method for implementing speaking right seizing of a Long Term Evolution (LTE)-based broadband trunking system, wherein, the LTE-based broadband trunking system comprises a speaking right terminal and a speaking right seizing terminal located in the same group, a broadband wireless access subsystem, a network subsystem and a trunking scheduling management center, and the method comprises:

the broadband wireless access subsystem sending a trunking speaking right update request to the network subsystem, receiving trunking speaking right update accept message returned by the network subsystem, and sending the trunking speaking right update accept message to the speaking right seizing terminal;

the broadband wireless access subsystem, the network subsystem and the speaking right terminal interacting to complete a trunking speaking right context modification; and the broadband wireless access subsystem receiving speaking right occupation prompt message sent by the network subsystem, and sending trunking speaking right occupation prompt message to the speaking right terminal and the speaking right seizing terminal via a multicast control channel of an enhanced Multimedia Broadcast Multicast Service (eMBMS) and updating configuration information.

Alternatively, the method further comprises: before the broadband wireless access subsystem sends the trunking speaking right update request to the network subsystem, the broadband wireless access subsystem completing an establishment of a default bearer by interacting with the speaking right seizing terminal, the network subsystem and the trunking scheduling management center; and the broadband wireless access subsystem transparently transferring a trunking dedicated speaking right request sent by the speaking right seizing terminal to the network subsystem, so that the network subsystem completes an establishment of a trunking dedicated bearer.

Alternatively, the broadband wireless access subsystem completing the establishment of the default bearer by interacting with the speaking right seizing terminal, the network subsystem and the trunking scheduling management center comprises:

the broadband wireless access subsystem receiving a trunking speaking right application request sent by the speaking right seizing terminal, and sending the trunking speaking right application request to the trunking scheduling management center via the network subsystem; and the network subsystem receiving a trunking context establishment request sent by the trunking scheduling management center, and interacting with the broadband wireless access subsystem and the seizing terminal to complete the establishment of the default bearer; wherein, the trunking context establishment request is sent after the trunking scheduling management center performs authentication, certification and policy decision on the seizing terminal after receiving the trunking speaking right application request.

Alternatively, the broadband wireless access subsystem sending the trunking speaking right update request to the network subsystem, and receiving the trunking speaking right update accept message returned by the network subsystem comprises:

the broadband wireless access subsystem sending the trunking speaking right update request to the network subsystem, the network subsystem receiving the trunking speaking right update accept message returned by the trunking scheduling management center after performing information updating of a trunking speaking right with the trunking scheduling management center according to the trunking speaking right update request, and the broadband wireless access subsystem receiving the trunking speaking right update accept message returned by the network subsystem.

Alternatively, the broadband wireless access subsystem, the network subsystem and the speaking right terminal interacting to complete the trunking speaking right context modification comprises:

the broadband wireless access subsystem receiving a trunking speaking right context modification request sent by the network subsystem;

the broadband wireless access subsystem, the network subsystem and the speaking right terminal interacting to complete bearer and air interface resource release of the speaking right terminal; and the broadband wireless access subsystem sending trunking speaking right context modification completion message to the network subsystem.

The example of the present document further provides a method for implementing speaking right seizing of a Long Term Evolution (LTE)-based broadband trunking system, wherein, the LTE-based broadband trunking system comprises a speaking right terminal and a speaking right seizing terminal located in the same group, a broadband wireless access subsystem, a network subsystem and a trunking scheduling management center, and the method comprises:

the network subsystem performing information updating of a trunking speaking right with the trunking scheduling management center, and sending trunking speaking right update accept message to the speaking right seizing terminal via the broadband wireless access subsystem;

the network subsystem, the broadband wireless access subsystem and the speaking right terminal interacting to complete a trunking speaking right context modification; and the network subsystem sending speaking right occupation prompt message to the broadband wireless access subsystem, so that the broadband wireless access subsystem sends trunking speaking right occupation prompt message to the speaking right seizing terminal and the speaking right terminal via a multicast control channel of an enhanced Multimedia Broadcast Multicast Service (eMBMS) and updates configuration information.

Alternatively, the method further comprises: before the network subsystem performs information updating of the trunking speaking right with the trunking scheduling management center, the network subsystem completing an establishment of a default bearer between the network subsystem, the broadband wireless access subsystem and the speaking right seizing terminal by interacting with the speaking right seizing terminal, the broadband wireless access subsystem and the trunking scheduling management center; and the network subsystem receiving a trunking dedicated speaking right request transparently transferred by the speaking right seizing terminal via the broadband wireless access subsystem, and interacting with the broadband wireless access subsystem and the speaking right seizing terminal to complete an establishment of a trunking dedicated bearer.

Alternatively, the network subsystem completing the establishment of the default bearer between the network subsystem, the broadband wireless access subsystem and the speaking right seizing terminal by interacting with the speaking right seizing terminal, the broadband wireless access subsystem and the trunking scheduling management center comprises:

the network subsystem receiving a trunking speaking right application request sent by the speaking right seizing terminal via the broadband wireless access subsystem, and sending the trunking speaking right application request to the trunking scheduling management center; and the network subsystem receiving a trunking context establishment request sent by the trunking scheduling management center, and interacting with the broadband wireless access subsystem and the speaking right seizing terminal to complete the establishment of the default bearer; wherein, the trunking context establishment request is sent after the trunking scheduling management center performs authentication, certification and policy decision on the speaking right seizing terminal after receiving the trunking speaking right application request.

Alternatively, the network subsystem sending the trunking speaking right update accept message to the speaking right seizing terminal via the broadband wireless access subsystem comprises:

the network subsystem receiving the trunking speaking right update accept message sent by the trunking scheduling management center, and sending the trunking speaking right update accept message to the speaking right seizing terminal via the broadband wireless access subsystem.

Alternatively, the network subsystem, the broadband wireless access subsystem and the speaking right terminal interacting to complete the trunking speaking right context modification comprises:

the network subsystem sending a trunking speaking right context modification request to the broadband wireless access subsystem;

the network subsystem, the broadband wireless access subsystem and the speaking right terminal interacting to complete bearer and air interface resource release of the speaking right terminal; and the network subsystem receiving trunking speaking right context modification completion message sent by the broadband wireless access subsystem.

The example of the present document further provides a Mobile Management Entity (MME), which is applied in a Long Term Evolution (LTE)-based broadband trunking system; the MME comprises:

a first establishment module, configured to: by interacting with a speaking right seizing terminal, a first base station to which the speaking right seizing terminal belongs and a trunking scheduling management center, complete an establishment of a default bearer between the first establishment module, the first base station and the speaking right seizing terminal;

a second establishment module, configured to: by interacting with the first base station, and a Service Gateway (SGW) and a Packet Data Network Gateway (PDN-GW or P-GW) located in the same network subsystem in which the MME is located, complete an establishment of a trunking dedicated speaking right seizing bearer;

an update module, configured to: by interacting with a Multimedia Broadcast Multicast Service-Gateway (MBMS- GW), the SGW and the trunking scheduling management center, complete trunking speaking right update, and send trunking speaking right request accept message to the speaking right seizing terminal via the first base station;

a modification module, configured to: by interacting with a speaking right terminal and a second base station to which the speaking right terminal belongs, complete a trunking speaking right context modification; and an occupation module, configured to: send a trunking speaking right occupation prompt to the first base station and the second base station, so that the first base station and the second base station notify all terminals within a trunking area of speaking right occupation via a control channel of a Multicast Broadcast Single Frequency Network (MBSFN) area and update configuration information.

Alternatively, the first establishment module is configured to complete the establishment of the default bearer between the first establishment module, the first base station and the speaking right seizing terminal by interacting with the speaking right seizing terminal, the first base station to which the speaking right seizing terminal belongs and the trunking scheduling management center in the following way:

receiving a trunking speaking right application request sent by the speaking right seizing terminal via the first base station, and sending the trunking speaking right application request to the trunking scheduling management center, wherein, the trunking speaking right application request contains a trunking session identity; and receiving a trunking context establishment request sent by the trunking scheduling management center, and interacting with the first base station and the speaking right seizing terminal to complete the establishment of the default bearer; wherein, the trunking context establishment request is sent after the trunking scheduling management center performs authentication, certification and policy decision on the speaking right seizing terminal after receiving the trunking speaking right application request.

Alternatively, the second establishment module is configured to complete the establishment of the trunking dedicated speaking right seizing bearer by interacting with the first base station, and the SGW and the P-GW located in the same network subsystem in which the MME is located in the following way:

receiving trunking dedicated speaking right seizing request message transparently transferred by the speaking right seizing terminal via the first base station;

interacting with the SGW and the P-GW to perform a bearer establishment of a speaking right user;

sending a trunking dedicated speaking right seizing bearer establishment request to the first base station; and receiving trunking dedicated speaking right seizing bearer establishment completion message sent after the first base station completes configurations according to the trunking dedicated speaking right seizing bearer establishment request.

Alternatively, the update module is configured to complete the trunking speaking right update by interacting with the MBMS-GW, the SGW and the trunking scheduling management center and send the trunking speaking right request accept message to the speaking right seizing terminal via the first base station in the following way:

sending a trunking speaking right update request to the SGW, and receiving trunking speaking right update response message returned by the SGW;

sending a trunking speaking right update request to the trunking scheduling management center via the MBMS-GW, and receiving a trunking speaking right update accept request returned by the trunking scheduling management center; and sending trunking speaking right request accept message to the speaking right seizing terminal via the first base station.

Alternatively, the modification module is configured to complete the trunking speaking right context modification by interacting with the speaking right terminal and the second base station to which the speaking right terminal belongs in the following way:

sending a trunking speaking right context modification request to the second base station;

releasing a bearer context of the speaking right terminal with the second base station; and receiving trunking speaking right context modification response message returned after the second base station releases a connection of the speaking right terminal.

The example of the present document further provides a network subsystem, which comprises: a Mobile Management Entity (MME), a Service Gateway (SGW) and a Broadcast Multicast Service Center (BM-SC) and a Home Subscriber Server (HSS) connected to the MME, a Multimedia Broadcast Multicast Service-Gateway (MBMS-GW) connected to the BM-SC, and a Packet Data Network Gateway (P-GW) connected to both the BM-SC and the SGW, wherein:

the MME is the above MME;

the MBMS-GW is configured to: take charge of saving multicast address, distributing data and processing a trunking service session control command;

the P-GW is configured to: receive a trunking service bearer establishment request sent by a trunking scheduling management center, and forward trunking service request information sent by a User Equipment (UE) and processed by the MME to the trunking scheduling management center; and the HSS is configured to: save information of a base station to which a terminal belongs and an identity of a group to which the terminal belongs.

The example of the present document further provides a broadband wireless access subsystem, which comprises multi-cells or a Multicast Cooperation Entity (MCE) and multiple base stations, wherein:

the base stations are configured to: establish radio bearers for trunking service sessions, and notify terminals which the base stations serve of the configured radio bearer information; and the MCE is configured to: take charge of performing radio resource allocations of the trunking service sessions transmitted by a Multicast Broadcast Single Frequency Network (MBSFN) with respect to the base stations in an MBSFN area.

Alternatively, the MCE is further configured to: receive a trunking service session start request from a Mobile Management Entity (MME), generate scheduling control information of the radio resources according to a quality of service, and send the scheduling control information to the base stations.

Alternatively, the base stations are further configured to:

receive a trunking speaking right context modification request sent by the MME, release a bearer context of a speaking right terminal with the MME, perform Radio Resource Control (RRC) connection release with respect to the speaking right terminal which the base stations serve, and return a trunking speaking right context modification request response to the MME; or receive a trunking dedicated speaking right seizing bearer establishment request sent by the MME, perform an establishment of RRC connection reconfiguration with a speaking right seizing terminal which the base stations serve, and return trunking dedicated speaking right seizing bearer establishment completion message to the MME.

The example of the present document further provides a Long Term Evolution (LTE)-based broadband trunking system, which comprises orderly connected a terminal, a broadband wireless access subsystem, a network subsystem and a trunking scheduling management center, and an operation maintenance subsystem connected to both the broadband wireless access subsystem and the network subsystem, wherein:

the broadband wireless access subsystem is the above broadband wireless access subsystem;

the network subsystem is the above network subsystem;

the trunking scheduling management center is configured to: take charge of completing trunking service speaking right management and scheduling, authorization management of trunking single call or group call, type of service assignment of trunking services and quality of service configuration of trunking services; and the operation maintenance subsystem is configured to: complete various operations of account opening, account cancellation and user service authority of trunking users, and perform management on parameter configuration, performance and security of devices of the broadband wireless access subsystem and the network subsystem.

Alternatively, the system further comprises: an Internet Protocol Multimedia Subsystem (IMS), which is located between the network subsystem and the trunking scheduling management center, wherein:

the IMS is configured to: provide protocol and flow support for trunking functions.

The above LTE-based broadband trunking system is deployed in combination with the eMBMS technology and network elements, in the condition that new network element devices are not required to be added, point-to-multipoint characteristics of the trunking system can be satisfied by fully utilizing the downlink multicast technology of the eMBMS. Moreover, it is only required to modify or extend functions of part of the network elements, then the LTE-based broadband digital trunking system can be deployed, and it also can be integrated into a public network to some degree in the follow-up, meanwhile, a speaking right seizing flow of LTE-based broadband trunking services can be implemented on this basis.

PREFERRED EMBODIMENTS OF THE PRESENT DOCUMENT

The examples of the present document will be described in detail in combination with the accompanying drawings below. It should he noted that the examples in the present document and the characteristics in the examples can be optionally combined with each other in the condition of no conflict.

Figure 1:
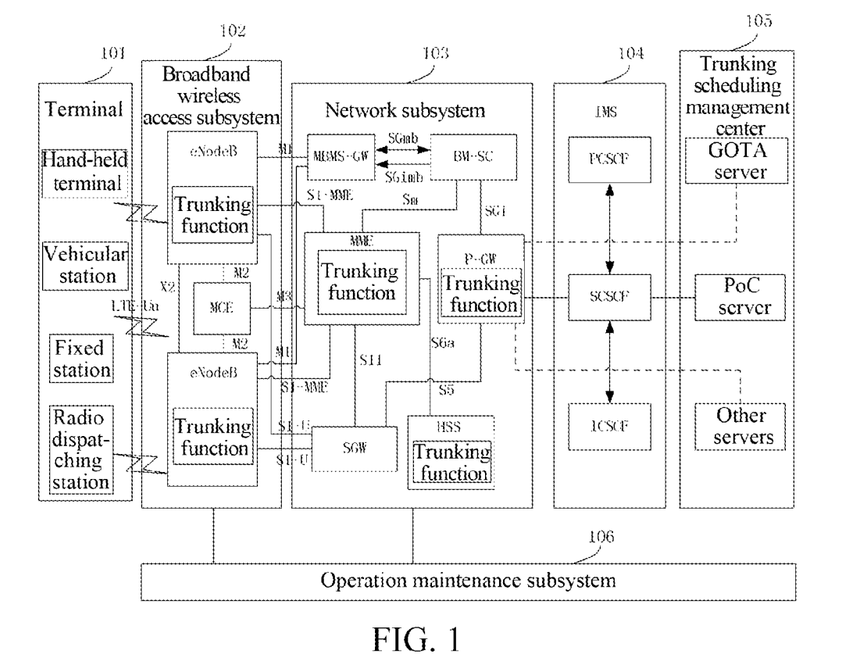
FIG. 1 is a schematic diagram of structure of an LTE-based broadband digital trunking system according to the example of the present document.

As shown in FIG. 1, FIG. 1 is a schematic diagram of structure of an LTE-based broadband digital trunking system according to the example of the present document, the system includes a terminal 101, a broadband wireless access subsystem 102. a network subsystem 103, an IMS 104, a trunking scheduling management center 105 and an operation maintenance subsystem 106; and if the trunking scheduling management center 105 can complete the same functions of the IMS 104, the IMS 104 can be not deployed.

Wherein, the above terminal 101 includes a speaking right terminal and a speaking right seizing terminal located in the same group, and the above terminal can be a hand-held terminal, a vehicular station, a fixed station or a radio dispatching station.

The above broadband wireless access subsystem 102 includes multiple Evolved Nodes B (eNodeB) and multi-cells or an MCE, an eNodeB establishes a radio bearer for a trunking service session, and notifies the terminal 101 of the configured radio bearer information. The MCE is responsible for performing radio resource allocations of the trunking service sessions transmitted by an MBSFN with respect to the eNodeB in an MBSFN area, including the time domain resource allocation and the coding modulation scheme selection; and the MCE is also responsible for transmitting a trunking service session control signaling sent by an MME.

The MCE receives a trunking service session start request from an M3 interface, generates scheduling control information of the radio resources according to a Quality of Service (Qos), and sends the scheduling control information to the eNodeB through an M2 interface. The MCE and the eNodeB are connected via the M2 interface.

The hand-held mobile station, vehicular station, fixed station and radio dispatching station share the radio resources with the broadband wireless access subsystem 102 via an LTE-Uu interface.

The above network subsystem 103 includes an MME, an SGW, an HSS, a BM-SC, an MBMS-GW and a P-GW.

Wherein, the P-GW is respectively connected to gateways supporting different trunking service broadcast characteristics. According to broadcast characteristics requested by a trunking request service, the P-GW respectively requests the SGW or the BM-SC for establishing wireless access bearers of the trunking services. The BM-SC, as a source of the trunking service data multicast, provides convergence and transmission of the trunking services, authorization of the trunking services, initiation of the bearer establishment and session control. The MBMS-GW takes charge of multicast address saving, data distribution and processes a trunking service session control command. The MME is a trunking service session control node, caches the established group call information, and takes charge of establishing, maintaining and releasing various trunking services. The MME receives a trunking service serving request from the SGW or MBMS-GW, configures the quality of service of the trunking services and transmission bearer information; and controls to establish the trunking service wireless access bearer via an S1 interface or the M3 interface. Meanwhile, the MME also forwards the received trunking service request of the UE to the PDN-GW. The HSS stores home subscription information of a terminal user. In order to support the trunking functions, it is required to newly add a module supporting the trunking services, the module stores information of an eNodeB to which the UE belongs and an identity (e.g., a Temporary Mobile Group Identity (TMGI)) of a group to which the UE belongs, that is, {group identity, group service distribution area information, terminal list information} is stored. The SGW is an end point of connecting to a media data interface of the broadband wireless access subsystem 102, and it mainly takes charges of routing and forwarding of data packets.

The MME is connected to the SGW via an S11 interface, the MME is connected to the HSS via an S6a interface, the MME is connected to the BM-SC via an Sm interface, the SGW is connected to the P-GW via an S5 interface, the BM-SC is connected to the P-GW via an SGi interface, and the BM-SC is connected to the MBMS-GW via SGmb and SGimb interfaces. The eNodeB is connected to the MBMS-GW via an M1 interface, and the MCE is connected to the MME via the M3 interface.

The above trunking scheduling management center 105 is connected to the PDN-GW, and it takes charges of completing trunking service speaking right management and scheduling, authorization management of trunking single call/group call, type of service assignment of trunking services and quality of service configuration of trunking services, moreover, it is an entrance of the P-GW with respect to an authentication on the user terminal and the radio dispatching station. Trunking application servers include an application server based on Push-to-Talk over Cellular (PoC), a trunking application server based on Global Open Trunking Architecture (GOTA) and other types of trunking application servers. If the other types of trunking application servers could complete a session control function by carrying out follow-up extensions, the IMS 104 is not required to be deployed, a Session Initial Protocol (SIP) signaling is not used, and a private signaling can be used.

The trunking scheduling management center 105 informs the PDN-GW of a trunking service bearer establishment request; meanwhile, the PDN-GW forwards the trunking service request information sent by the UE and processed by the MME to the trunking scheduling management center 105.

In addition, the above operation maintenance subsystem 106 mainly completes a user data management function, it can carry out operations such as account opening of the trunking users, account cancellation and change of user service authority and so on, and meanwhile it can perform management on parameter configuration, performance and security of devices of the broadband wireless access subsystem 102 and the network subsystem 103.

Figure 2:
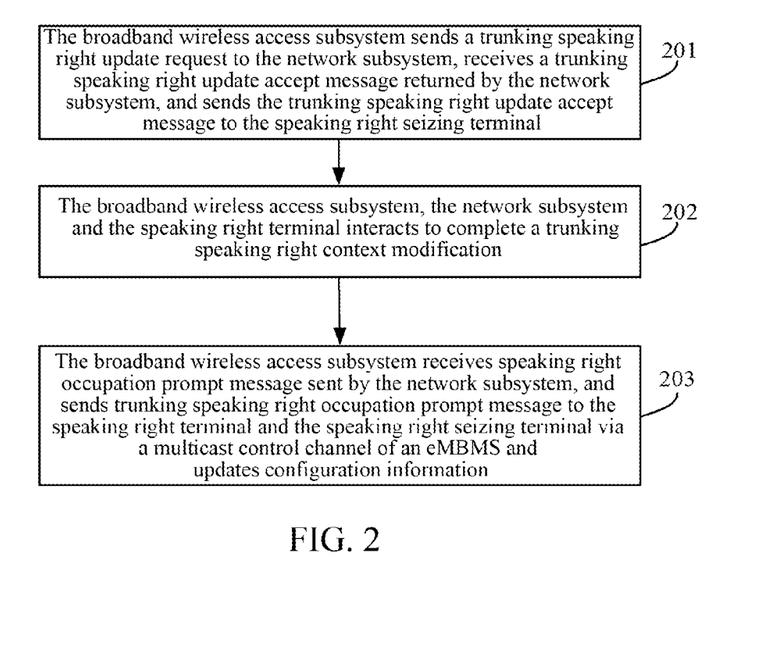
FIG. 2 is a flow diagram 1 of a method for implementing speaking right seizing of the LTE-based broadband digital trunking system according to the example of the present document.

Based on the broadband trunking system shown in FIG. 1, the example of the present document provides a method for implementing speaking right seizing, descriptions are made from a perspective of the broadband wireless access subsystem in the method, and as shown in FIG. 2, the following steps are included.

In step 201, the broadband wireless access subsystem sends a trunking speaking right update request to the network subsystem, receives trunking speaking right update accept message returned by the network subsystem, and sends the trunking speaking right update accept message to the speaking right seizing terminal Wherein, the trunking speaking right update accept message is returned by the trunking scheduling management center after the network subsystem performs information updating of the trunking speaking right according to the trunking speaking right update request and the trunking scheduling management center.

Before the step 201, it can also include: the broadband wireless access subsystem completing an establishment of a default bearer by interacting with the speaking right seizing terminal, the network subsystem and the trunking scheduling management center; and the broadband wireless access subsystem transparently transferring a trunking dedicated speaking right request sent by the speaking right seizing terminal to the network subsystem, so that the network subsystem completes an establishment of a trunking dedicated bearer.

In step 202, the broadband wireless access subsystem, the network subsystem and the speaking right terminal interacts to complete a trunking speaking right context modification.

In step 203, the broadband wireless access subsystem receives speaking right occupation prompt message sent by the network subsystem, and sends trunking speaking right occupation prompt message to the speaking right terminal and the speaking right seizing terminal via a multicast control channel of an eMBMS and updates configuration information.

Figure 3:
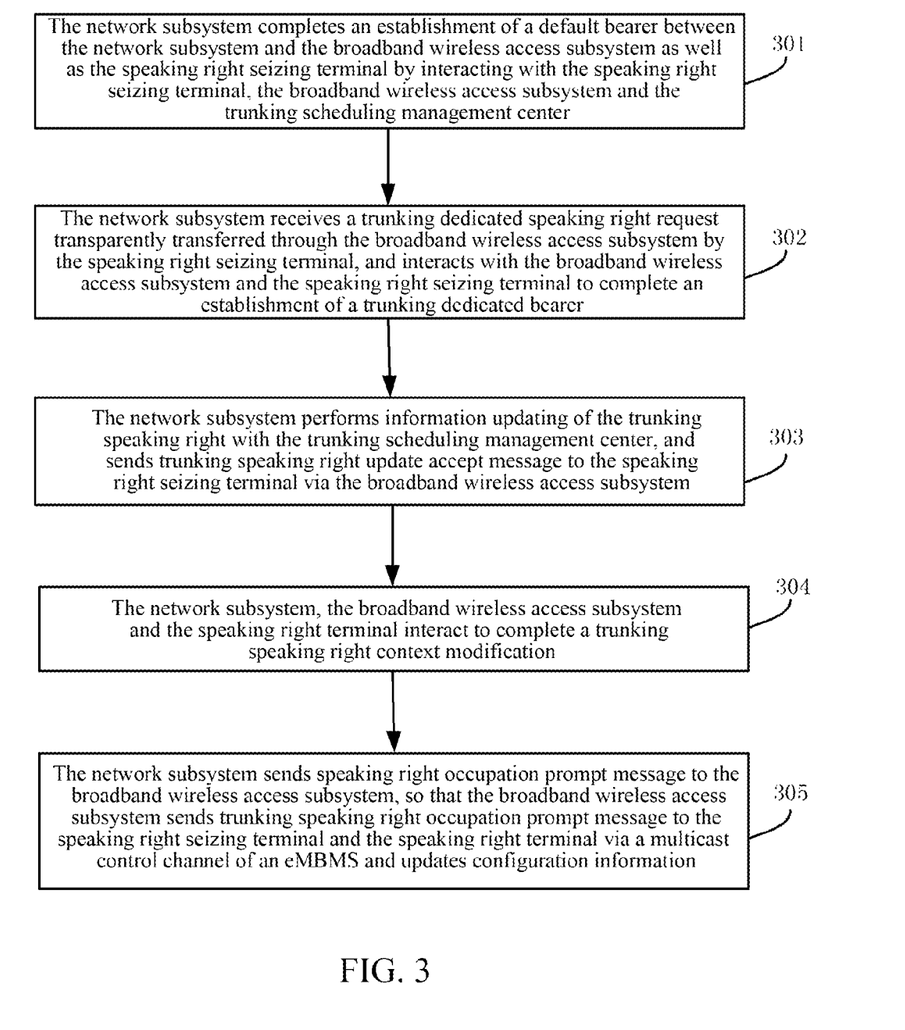
FIG. 3 is a flow diagram 2 of a method for implementing speaking right seizing of the LTE-based broadband digital trunking system according to the example of the present document.

Similarly, based on the broadband trunking system shown in FIG. 1, the example of the present document also provides a method for implementing speaking right seizing, descriptions are made from a perspective of the network subsystem in the method, and as shown in FIG. 3, the following steps are included.

In step 301, the network subsystem completes an establishment of a default bearer between the network subsystem, the broadband wireless access subsystem and the speaking right seizing terminal by interacting with the speaking right seizing terminal, the broadband wireless access subsystem and the trunking scheduling management center.

The step 301 can include: the network subsystem receiving a trunking speaking right application request sent by the speaking right seizing terminal via the broadband wireless access subsystem, and sending the trunking speaking right application request to the trunking scheduling management center; and the network subsystem receiving a trunking context establishment request sent by the trunking scheduling management center, and interacting with the broadband wireless access subsystem and the speaking right seizing terminal to complete the establishment of the default bearer; wherein, the trunking context establishment request is sent after the trunking scheduling management center performs authentication, certification and policy decision on the speaking right seizing terminal after receiving the trunking speaking right application request.

In step 302, the network subsystem receives a trunking dedicated speaking right request transparently transferred by the speaking right seizing terminal via the broadband wireless access subsystem, and interacts with the broadband wireless access subsystem and the speaking right seizing terminal to complete an establishment of a trunking dedicated bearer.

The above step 301 and step 302 are optional steps.

In step 303, the network subsystem performs information updating of the trunking speaking right with the trunking scheduling management center, and sends trunking speaking right update accept message to the speaking right seizing terminal via the broadband wireless access subsystem.

The step 303 includes: the network subsystem receiving the trunking speaking right update accept message sent by the trunking scheduling management center, and sending the trunking speaking right update accept message to the speaking right seizing terminal via the broadband wireless access subsystem.

In step 304, the network subsystem, the broadband wireless access subsystem and the speaking right terminal interact to complete a trunking speaking right context modification.

The step 304 can include: the network subsystem sending a trunking speaking right context modification request to the broadband wireless access subsystem; the network subsystem, the broadband wireless access subsystem and the speaking right terminal interacting to complete bearer and air interface resource release of the speaking right terminal; and the network subsystem receiving trunking speaking right context modification completion message sent by the broadband wireless access subsystem.

In step 305, the network subsystem sends speaking right occupation prompt message to the broadband wireless access subsystem, so that the broadband wireless access subsystem sends trunking speaking right occupation prompt message to the speaking right seizing terminal and the speaking right terminal via a multicast control channel of an eMBMS and updates configuration information.

The technical scheme of the example of the present document will be described in detail from a perspective of interaction between the terminal, the network subsystem, the broadband wireless access subsystem and the trunking scheduling management center below.

Figure 4:
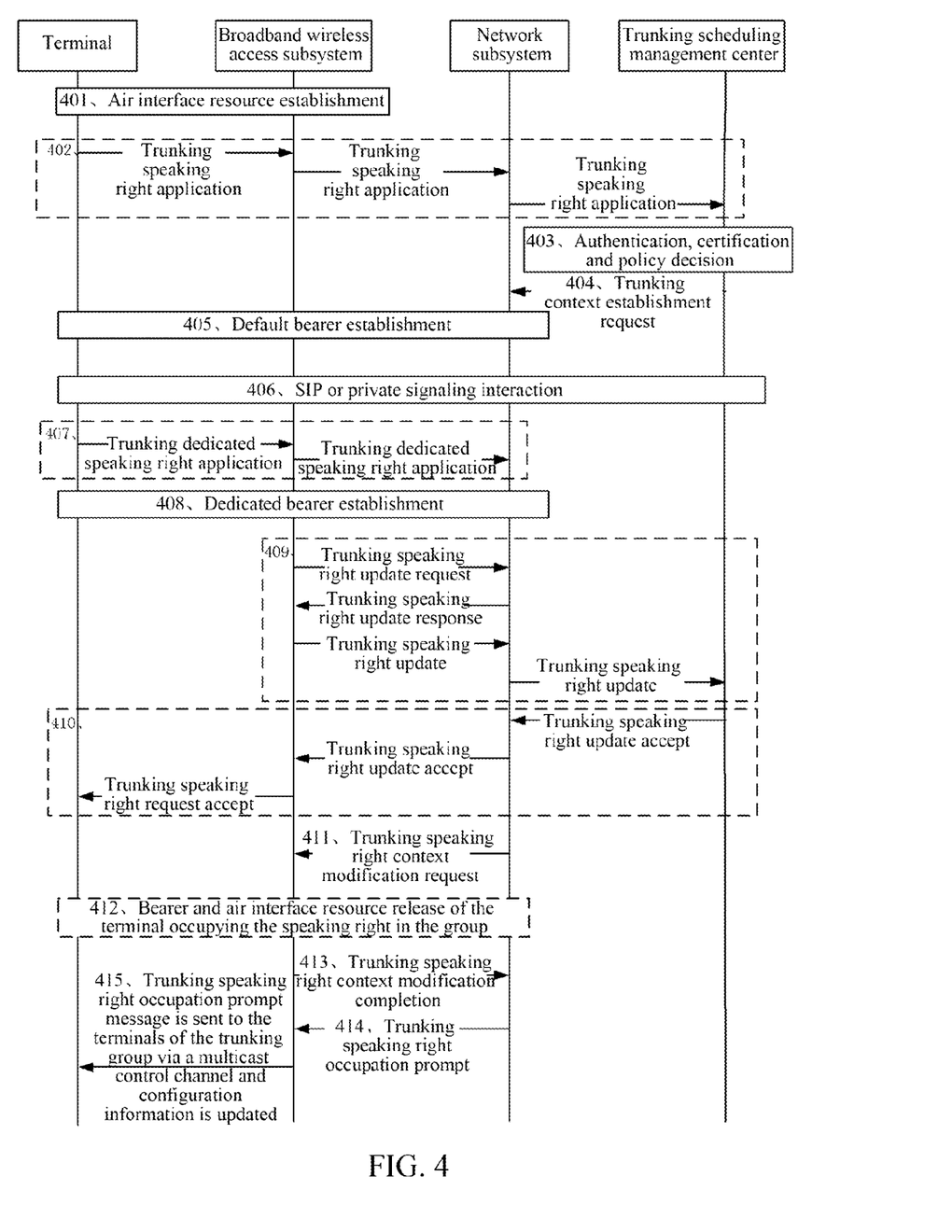
FIG. 4 is a flow diagram of overall signaling of a speaking right seizing process of the LTE-based broadband digital trunking system according to the example of the present document.

As shown in FIG. 4, a speaking right seizing process of the LTE-based broadband trunking system includes the following steps.

In step 401, a terminal user presses a Push to Talk (PTT) key, and interacts with the broadband wireless access subsystem to complete an establishment of air interface resources.

In step 402, the terminal sends a trunking speaking right application request, and the request message is sent to the trunking scheduling management center via the network subsystem for performing speaking right application.

In step 403, the trunking scheduling management center performs authentication and certification on the terminal after receiving the speaking right application, and determines a priority of the terminal that is seizing the speaking right currently and a priority of the terminal that is occupying the speaking right according to a certain policy rule, so as to judge whether the request of the seizing terminal is accepted or not.

In step 404, according to an authentication and certification result and a decision policy, if accepted, the trunking scheduling management center sends a trunking context establishment request to the network subsystem, and if not accepted, sends a trunking context establishment rejection to the terminal via the network subsystem.

In step 405, the network subsystem interacts with the broadband wireless access subsystem and the terminal to complete an establishment of the default bearer after receiving the trunking context establishment request.

In step 406, the terminal and the trunking scheduling management center negotiate information including data configurations and so on required to be transferred in the follow-up through SIP message or private protocol message.

In step 407, the terminal transparently transfers a trunking dedicated speaking right request to the network subsystem via the broadband wireless access subsystem.

In step 408, the network subsystem interacts with the broadband wireless access subsystem and the terminal to complete an establishment of the trunking dedicated bearer after receiving the trunking dedicated speaking right request.

In step 409, the network subsystem and the trunking scheduling management center perform information updating of the trunking speaking right.

In step 410, the trunking scheduling management center sends trunking speaking right update accept message to the network subsystem, the network subsystem forwards the trunking speaking right update accept message to the broadband wireless access subsystem, and the broadband wireless access subsystem sends trunking speaking right request accept message to the terminal.

In step 411, the network subsystem sends a trunking speaking right context modification request to the broadband wireless access subsystem after receiving the trunking speaking right update accept message of the trunking scheduling management center, and requests for releasing resources of the terminal that is occupying the speaking right.

In step 412, the network subsystem, the broadband wireless access subsystem and the terminal interact to complete bearer and air interface resource release of the terminal that is occupying the speaking right in the group.

In step 413, the broadband wireless access subsystem returns trunking speaking right context modification completion message to the network subsystem.

In step 414, the network subsystem sends speaking right occupation prompt message to the broadband wireless access subsystem.

In step 415, the broadband wireless access subsystem sends trunking speaking right occupation prompt message to the terminals of the trunking group via a multicast control channel of an eMBMS and updates configuration information.

For an easy understanding of the example of the present document, the implementation of the example of the present document will be described in detail by giving the application example as an example below.

Figure 5:
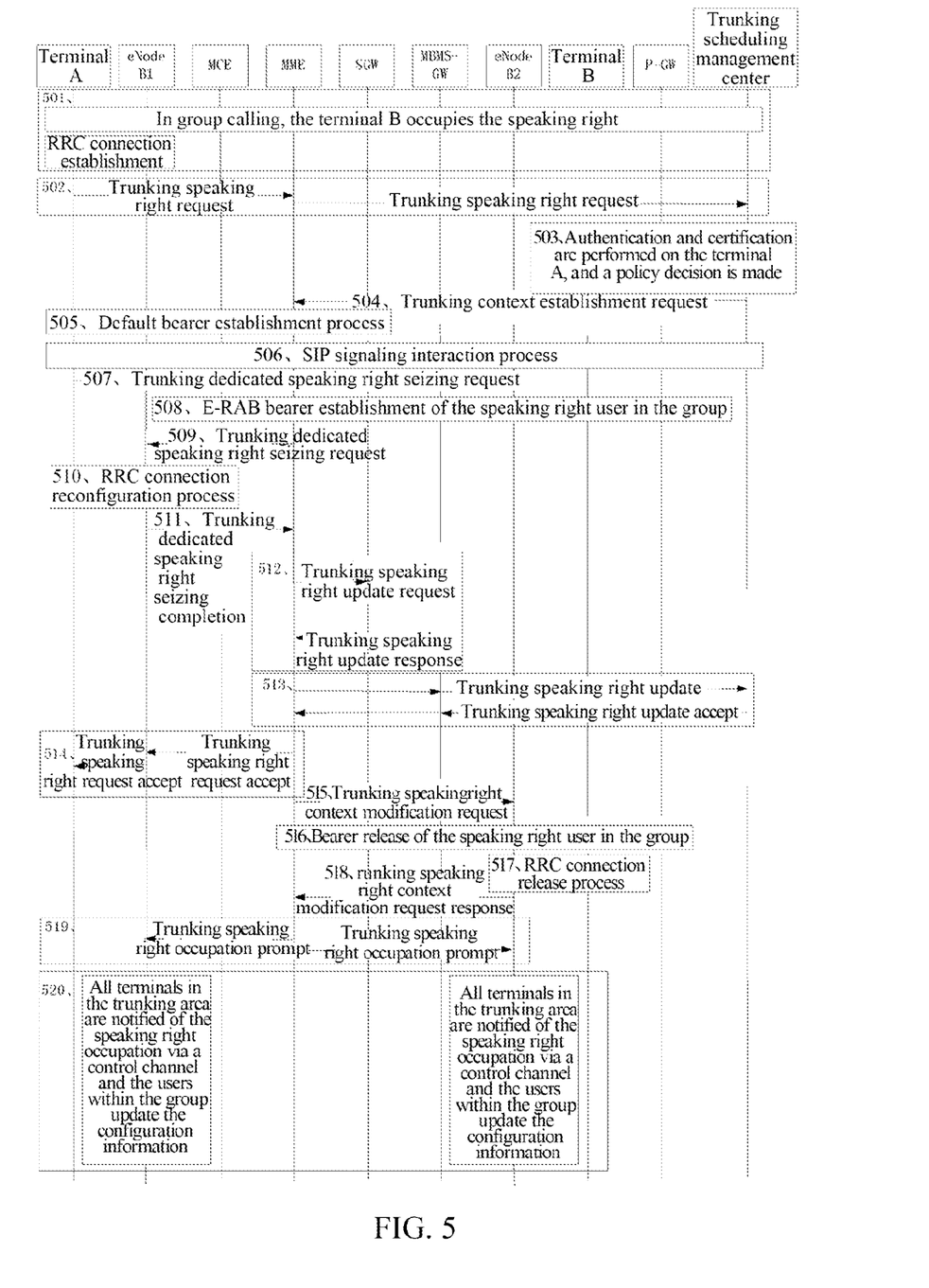
FIG. 5 is a flow diagram of signaling of speaking right seizing of the LTE-based broadband digital trunking system according to the example of the present document.

In combination with FIG. 5, a trunking terminal A is in an eNodeB1, a trunking terminal B is in an eNodeB2, the trunking terminal A and the terminal group B belong to the same MBSFN area and trunking group, the trunking terminal B occupies the speaking right currently, and the speaking right seizing process of the LTE-based broadband trunking system includes the following steps.

In step 501, the terminal A is in an idle state, the terminal B is in the speaking right occupation, if the terminal A seizes the trunking speaking right, and when the user presses the PTT key, the terminal A and the eNodeB1 perform interaction for random access and RRC connection establishment.

In step 502, the terminal A sends a trunking speaking right request to a trunking scheduling management center via an MME, the speaking right application message is encapsulated through a Non Access Stratum (NAS) message and contains a trunking session identity.

In step 503, the trunking scheduling management center performs authentication and information confirmation within the trunking user group on the terminal A after receiving the trunking speaking right request of the terminal A, and performs speaking right granting of policies according to speaking right priorities of the terminal A and the terminal B, and here the trunking scheduling management center grants a pass.

In step 504, the trunking scheduling management center sends a trunking context establishment request to the MME.

In step 505, the MME, the eNodeB1 and the trunking terminal A complete an establishment of the default bearer.

In step 506, the terminal A and the trunking scheduling management center negotiate information including QoS, IP address and port number and so on of the data required to be transferred in the follow-up through the SIP message.

In step 507, the trunking terminal A transparently transfers trunking dedicated speaking right seizing request message to the MME via the eNodeB1.

In step 508, the MME interacts with an SGW and a P-GW to perform a bearer establishment of the user.

In step 509, the MME sends a trunking dedicated speaking right seizing bearer establishment request to the eNodeB1.

In step 510, the eNodeB1 performs an establishment of RRC connection reconfiguration after receiving the dedicated speaking right seizing bearer establishment request, an uplink shared channel is mainly configured in the reconfiguration, and a multicast downlink channel is used in downlink.

In step 511, the eNodeB1 returns trunking dedicated speaking right seizing bearer establishment completion message to the MME after completing the configurations.

In step 512, the MME sends a trunking speaking right update request to the SGW, and the SGW returns trunking speaking right update response message to the MME.

In step 513, the MME sends a trunking speaking right update request to the trunking scheduling management center via an MBMS-GW, and the trunking scheduling management center returns a trunking speaking right update accept request to the MME, to indicate that the speaking right application of the trunking terminal A is accepted.

In step 514, the MME sends trunking speaking right request accept message to the trunking terminal A via the eNodeB1, and the trunking terminal A believes that the speaking right of this time is applied.

In step 515, the MME sends a trunking speaking right context modification request to the eNodeB2 so as to release a bearer context of the terminal B.

In step 516, the MME and the eNodeB2 release the bearer context of the terminal B. In step 517, the eNodeB2 performs RRC connection release on the terminal B.

In step 518, the eNodeB2 returns trunking speaking right context modification response message to the MME after completing the release.

In step 519, the MME sends a trunking speaking right occupation prompt to the eNodeB1 and the eNodeB2 respectively.

In step 520, the eNodeB1 and the eNodeB2 notify the terminal group B and other terminals in the trunking group of that the speaking right has been occupied via a control channel of the MBSFN area, and update the configuration information.

The above trunking system architecture is deployed in combination with the eMBMS technology and network elements, in the condition that new network element devices are not required to be added, point-to-multipoint characteristics of the trunking system can be satisfied by fully utilizing the eMBMS downlink multicast technology. Moreover, it is only required to modify or extend functions of part of the network elements, then the LTE-based broadband digital trunking system can be deployed, and it also can be integrated into a public network to some degree in the follow-up, meanwhile, a speaking right seizing flow can be implemented on this basis.

Figure 6:
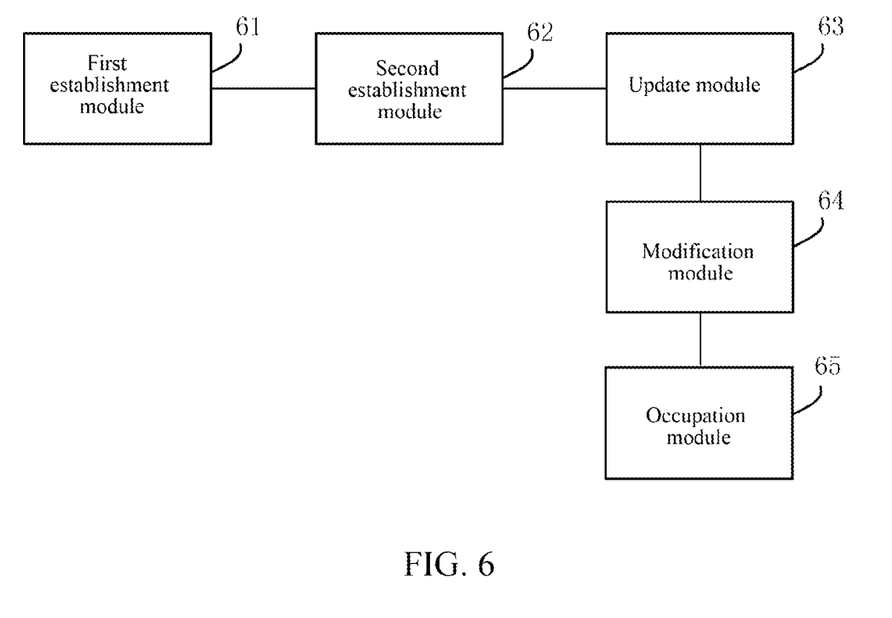
FIG. 6 is a schematic diagram of structure of an MME according to the example of the present document.

Corresponding to the above method, the example of the present document also provides an MME which is applied in the LTE-based broadband trunking system, and as shown in FIG. 6, the MME includes:

a first establishment module 61, used to: by interacting with a speaking right seizing terminal, a first base station to which the speaking right seizing terminal belongs and a trunking scheduling management center, complete an establishment of a default bearer between the first establishment module, the first base station and the speaking right seizing terminal;

a second establishment module 62, used to: by interacting with the first base station, and an SGW and a P-GW located in the same network subsystem in which the MME is located, complete an establishment of a trunking dedicated speaking right seizing bearer;

an update module 63, used to: by interacting with an MBMS-GW, the SGW and the trunking scheduling management center, complete trunking speaking right update, and send trunking speaking right request accept message to the speaking right seizing terminal via the first base station;

a modification module 64, used to: by interacting with a speaking right terminal and a second base station to which the speaking right terminal belongs, complete a trunking speaking right context modification; and an occupation module 65, used to: send a trunking speaking right occupation prompt to the first base station and the second base station, so that the first base station and the second base station notify all terminals within a trunking area of speaking right occupation via a control channel of an MBSFN area and update configuration information.

Wherein, the first establishment module 61 is used to complete the establishment of the default bearer between the first establishment module, the first base station and the speaking right seizing terminal by interacting with the speaking right seizing terminal, the first base station to which the speaking right seizing terminal belongs and the trunking scheduling management center in the following way:

receiving a trunking speaking right application request sent by the speaking right seizing terminal via the first base station, and sending the trunking speaking right application request to the trunking scheduling management center, wherein, the trunking speaking right application request contains a trunking session identity; and receiving a trunking context establishment request sent by the trunking scheduling management center, and interacting with the first base station and the speaking right seizing terminal to complete the establishment of the default bearer; wherein, the trunking context establishment request is sent after the trunking scheduling management center performs authentication, certification and policy decision on the speaking right seizing terminal after receiving the trunking speaking right application request.

The second establishment module 62 is used to complete the establishment of the trunking dedicated speaking right seizing bearer by interacting with the first base station, and the SGW and the P-GW located in the same network subsystem in which the MME is located in the following way:

receiving trunking dedicated speaking right seizing request message transparently transferred by the speaking right seizing terminal via the first base station; interacting with the SGW and the P-GW to perform a bearer establishment of a speaking right user; sending a trunking dedicated speaking right seizing bearer establishment request to the first base station; and receiving trunking dedicated speaking right seizing bearer establishment completion message sent after the first base station completes configurations according to the trunking dedicated speaking right seizing bearer establishment request.

The update module 63 is used to complete the trunking speaking right update by interacting with the MBMS-GW, the SGW and the trunking scheduling management center and send the trunking speaking right request accept message to the speaking right seizing terminal via the first base station in the following way:

sending a trunking speaking right update request to the SGW, and receiving trunking speaking right update response message returned by the SGW; sending a trunking speaking right update request to the trunking scheduling management center via the MBMS-GW, and receiving a trunking speaking right update accept request returned by the trunking scheduling management center; and sending trunking speaking right request accept message to the speaking right seizing terminal via the first base station.

The modification module 64 is used to complete the trunking speaking right context modification by interacting with the speaking right terminal and the second base station to which the speaking right terminal belongs in the following way:

sending a trunking speaking right context modification request to the second base station; releasing a bearer context of the speaking right terminal with the second base station; and receiving trunking speaking right context modification response message returned after the second base station releases a connection of the speaking right terminal A working flow of the MME may refer to FIG. 5.

The example of the present document also provides a network subsystem, which includes: the MME shown in FIG. 6, an SGW and a BM-SC and an HSS connected to the MME, an MBMS-GW connected to the BM-SC, and a P-GW connected to both the BM-SC and the SGW, wherein:

the MBMS-GW is used to: take charge of multicast address saving and data distribution and process a trunking service session control command;

the P-GW is used to: receive a trunking service bearer establishment request sent by a trunking scheduling management center, and forward trunking service request information sent by the UE and processed by the MME to the trunking scheduling management center; and the HSS is used to: save information of a base station to which the terminal belongs and an identity of a group to which the terminal belongs.

Moreover, the example of the present document also provides a broadband wireless access subsystem, which includes multi-cells or an MCE and multiple base stations, wherein:

the base stations are used to: establish radio bearers for trunking service sessions, and notify terminals which the base stations serve of the configured radio bearer information; and the MCE is used to: take charge of performing radio resource allocations of the trunking service sessions transmitted by an MBSFN with respect to the base stations in an MBSFN area.

Wherein, the MCE is also used to: receive a trunking service session start request from an MME, generate scheduling control information of the radio resources according to a quality of service, and send the scheduling control information to the base stations.

The base stations are also used to: receive a trunking speaking right context modification request sent by the MME, release a bearer context of the speaking right terminal with the MME, perform RRC connection release with respect to a speaking right terminal which the base stations serve, and return a trunking speaking right context modification request response to the MME; or receive a trunking dedicated speaking right seizing bearer establishment request sent by the MME, perform an establishment of RRC connection reconfiguration with a speaking right seizing terminal which the base stations serve, and return trunking dedicated speaking right seizing bearer establishment completion message to the MME.

A connection relationship between the above network subsystem and the broadband wireless access subsystem may refer to FIG. 1, and with a mutual coordination between the two systems and the trunking scheduling management center, the broadband digital trunking system can be implemented, and the speaking right seizing function also can be implemented.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The example of the present document is not limited to any combination of hardware and software in a specific form.

The above examples are only used to describe the technical scheme of the example of the present document, which does not limit the technical scheme of the present document. The present document is just described in detail with reference to the preferred examples. The ordinary person skilled in the art should understand that, with respect to the technical scheme of the example of the present document, modifications or equivalent substitutions can be made without departing from the spirit and scope of the technical scheme of the present document, and all these modifications and equivalent substitutions should be covered within the scope of the claims of the present document.

INDUSTRIAL APPLICABILITY

In the example of the present document, in the condition that new network element devices are not required to be added, an LTE-based broadband trunking system and a speaking right seizing process of the LTE-based broadband trunking system can be implemented.

What is claimed is:

1. A method for implementing a floor seizing of a Long Term Evolution (LTE)-based broadband trunking system, wherein, the LTE-based broadband trunking system comprises a first terminal and a second terminal located in a same group, a broadband wireless access subsystem, a network subsystem and a trunking scheduling management center, and the method comprises:

the broadband wireless access subsystem sending a request for updating a floor in a trunking service to the network subsystem, receiving an update accept message returned by the network subsystem, and sending the update accept message to the second terminal;

the broadband wireless access subsystem, the network subsystem and the first terminal interacting to complete a context modification for a floor in a trunking service; and the broadband wireless access subsystem receiving a prompt message indicating a floor is occupied and sent by the network subsystem, and sending the prompt message to the first terminal and the second terminal via a multicast control channel of an enhanced Multimedia Broadcast Multicast Service (eMBMS) and updating configuration information;

wherein the method further comprises connecting an operation maintenance subsystem to both the broadband wireless access subsystem and the network subsystem; wherein the operation maintenance subsystem takes charge of various operations of account opening, account cancellation and user service authority of trunking users, and performs management on parameter configuration, performance and security of devices of the broadband wireless access subsystem and the network subsystem.

2. The method according to claim 1, further comprising:
before the broadband wireless access subsystem sends the request for updating a floor in a trunking service to the network subsystem,
the broadband wireless access subsystem completing an establishment of a default bearer by interacting with the second terminal, the network subsystem and the trunking scheduling management center; and
the broadband wireless access subsystem transparently transferring a request for a dedicated floor in a trunking service sent by the second terminal to the network subsystem, so that the network subsystem completes an establishment of a dedicated bearer for a trunking service.

3. The method according to claim 2, wherein:
the broadband wireless access subsystem completing the establishment of the default bearer by interacting with the second terminal, the network subsystem and the trunking scheduling management center comprises:
the broadband wireless access subsystem receiving a request for acquiring a floor in a trunking service sent by the second terminal, and sending the request for acquiring a floor in a trunking service to the trunking scheduling management center via the network subsystem; and
the network subsystem receiving a trunking context establishment request sent by the trunking scheduling management center, and interacting with the broadband wireless access subsystem and the second terminal to complete the establishment of the default bearer; wherein, the trunking context establishment request is sent after the trunking scheduling management center performs authentication, certification and policy decision on the seizing terminal after receiving the request for acquiring a floor in a trunking service.

4. The method according to claim 1, wherein:
the broadband wireless access subsystem sending the request for updating a floor in a trunking service to the network subsystem, and receiving the update accept message returned by the network subsystem comprises:
the broadband wireless access subsystem sending the request for updating a floor in a trunking service to the network subsystem, the network subsystem receiving the update accept message returned by the trunking scheduling management center after the network subsystem performs information updating of a floor in a trunking service with the trunking scheduling management center according to the request for updating a floor in a trunking service, and the broadband wireless access subsystem receiving the update accept message returned by the network subsystem.

5. The method according to claim 1, wherein:
the broadband wireless access subsystem, the network subsystem and the first terminal interacting to complete the context modification for a floor in a trunking service comprises:
the broadband wireless access subsystem receiving a context modification request for a floor in a trunking service sent by the network subsystem;
the broadband wireless access subsystem, the network subsystem and the first terminal interacting to complete bearer and air interface resource release of the first terminal; and
the broadband wireless access subsystem sending a message to the network subsystem for notifying that the context modification for a floor in a trunking service is completed.

6. A method for implementing speaking right seizing of a Long Term Evolution (LTE)-based broadband trunking system, wherein, the LTE-based broadband trunking system comprises a first terminal and a second terminal located in a same group, a broadband wireless access subsystem, a network subsystem and a trunking scheduling management center, and the method comprises:
the network subsystem performing information updating of a floor in a trunking service with the trunking scheduling management center, and sending an update accept message to the second terminal via the broadband wireless access subsystem;
the network subsystem, the broadband wireless access subsystem and the first terminal interacting to complete a context modification for a floor in a trunking service; and
the network subsystem sending a prompt message indicating a floor is occupied to the broadband wireless access subsystem, so that the broadband wireless access subsystem sends the prompt message to the second terminal and the first terminal via a multicast control channel of an enhanced Multimedia Broadcast Multicast Service (eMBMS) and updates configuration information;
wherein the method further comprises connecting an operation maintenance subsystem to both the broadband wireless access subsystem and the network subsystem; wherein the operation maintenance subsystem takes charge of various operations of account opening, account cancellation and user service authority of trunking users, and performs management on parameter configuration, performance and security of devices of the broadband wireless access subsystem and the network subsystem.

7. The method according to claim 6, further comprising:
before the network subsystem performs information updating of a floor in a trunking service with the trunking scheduling management center,
the network subsystem completing an establishment of a default bearer between the network subsystem and the broadband wireless access subsystem as well as the second terminal by interacting with second terminal, the broadband wireless access subsystem and the trunking scheduling management center; and
the network subsystem receiving a request for a dedicated floor in a trunking service transparently transferred by the second terminal via the broadband wireless access subsystem, and interacting with the broadband wireless access subsystem and the second terminal to complete an establishment of a dedicated bearer for a trunking service.

8. The method according to claim 7, wherein:
the network subsystem completing the establishment of the default bearer between the network subsystem, the broadband wireless access subsystem and the second terminal by interacting with the second terminal, the broadband wireless access subsystem and the trunking scheduling management center comprises:
the network subsystem receiving a request for acquiring a floor in a trunking service sent by the second terminal via the broadband wireless access subsystem, and sending the request for acquiring a floor in a trunking service to the trunking scheduling management center; and
the network subsystem receiving a trunking context establishment request sent by the trunking scheduling management center, and interacting with the broadband wireless access subsystem and the second terminal to complete the establishment of the default bearer; wherein, the trunking context establishment request is sent after the trunking scheduling management center performs authentication, certification and policy decision on the second terminal after receiving the request for acquiring a floor in a trunking service.

9. The method according to claim 6, wherein:
the network subsystem sending the update accept message to the second terminal via the broadband wireless access subsystem comprises:
the network subsystem receiving the update accept message sent by the trunking scheduling management center, and sending the update accept message to the second terminal via the broadband wireless access subsystem.

10. The method according to claim 6, wherein:
the network subsystem, the broadband wireless access subsystem and the first terminal interacting to complete the context modification for a floor in a trunking service comprises:
the network subsystem sending a context modification request for a floor in a trunking service to the broadband wireless access subsystem;
the network subsystem, the broadband wireless access subsystem and the first terminal interacting to complete bearer and air interface resource release of the first terminal; and
the network subsystem receiving from the broadband wireless access subsystem a message notifying that the context modification for a floor in a trunking service is completed.

11. A Long Term Evolution (LTE)-based broadband trunking system, comprising orderly connected a terminal, a broadband wireless access subsystem, a network subsystem and a trunking scheduling management center, and an operation maintenance subsystem connected to both the broadband wireless access subsystem and the network subsystem, wherein:
the broadband wireless access subsystem comprises multi-cells or a Multicast Cooperation Entity (MCE) and multiple base stations, wherein:
the base stations are configured to: establish radio bearers for trunking service sessions, and notify terminals which the base stations serve of configured radio bearer information; and the MCE is configured to: take charge of performing radio resource allocations of the trunking service sessions transmitted by a Multicast Broadcast Single Frequency Network (MBSFN) with respect to the base stations in an MBSFN area;
the trunking scheduling management center is configured to: take charge of completing management and scheduling for a floor in a trunking service, authorization management of trunking single call or group call, type of service assignment of trunking services and quality of service configuration of trunking services; and
the operation maintenance subsystem is configured to: complete various operations of account opening, account cancellation and user service authority of trunking users, and perform management on parameter configuration, performance and security of devices of the broadband wireless access subsystem and the network subsystem;
wherein the network subsystem comprises a Mobile Management Entity (MME) to: interact with a first terminal, a second terminal, a first base station to which the
second terminal belongs and a second base station to which the first terminal belongs, and send to the first base station and the second base station a prompt message indicating a floor is occupied, so that the first base station and the second base station notify all terminals within a trunking area of a floor being occupied via a control channel of a Multicast Broadcast Single Frequency Network (MBSFN) area and update configuration information.

12. The broadband trunking system according to claim 11, further comprising:
an Internet Protocol Multimedia Subsystem (IMS), which is located between the network subsystem and the trunking scheduling management center, wherein:
the IMS is configured to: provide protocol and flow support for trunking functions.

13. The broadband trunking system according to claim 11, wherein the network subsystem further comprises: a Service Gateway (SGW) and a Broadcast Multicast Service Center (BM-SC) and a Home Subscriber Server (HSS) connected to the MME, a Multimedia Broadcast Multicast Service-Gateway (MBMS-GW) connected to the BM-SC, and a Packet Data Network Gateway (P-GW) connected to both the BM-SC and the SGW, wherein:
the MBMS-GW takes charge of saving multicast address, distributing data and processing a trunking service session control command;
the P-GW receives a trunking service bearer establishment request sent by a trunking scheduling management center, and forwards trunking service request information sent by a User Equipment (UE) and processed by the MME to the trunking scheduling management center; and
the HSS saves information of a base station to which a terminal belongs and an identity of a group to which the terminal belongs.

14. The broadband trunking system according to claim 13, wherein the MME comprises:
a processor, and
a non-transitory computer readable medium for storing program codes that when executed by the processor cause the processor to perform the following steps:
by interacting with the second terminal, the first base station to which the second terminal belongs and a trunking scheduling management center, completing an establishment of a default bearer between the MME and the first base station as well as the second terminal;

by interacting with the first base station, and a Service Gateway (SGW) and a Packet Data Network Gateway (P-GW) located in the same network subsystem in which the MME is located, completing an establishment of a dedicated bearer for seizing a floor in a trunking service;

by interacting with a Multimedia Broadcast Multicast Service-Gateway (MBMS-GW), the SGW and the trunking scheduling management center, completing updating a floor in a trunking service, and sending a message indicating a request for a floor in a trunking service is accepted, to the second terminal via the first base station;

by interacting with the first terminal and the second base station to which the first terminal belongs, completing a context modification for a floor in a trunking service; and sending to the first base station and the second base station a prompt message indicating a floor is occupied, so that the first base station and the second base station notify all terminals within a trunking area of a floor being occupied via a control channel of a Multicast Broadcast Single Frequency Network (MBSFN) area and update configuration information.

15. The broadband trunking system according to claim 14, wherein:

the step of completing the establishment of the default bearer between the MME, the first base station and the second terminal by interacting with the second terminal, the first base station to which the second terminal belongs and the trunking scheduling management center comprises:

receiving a request for acquiring a floor in a trunking service sent by the second terminal via the first base station, and sending the request for acquiring a floor in a trunking service to the trunking scheduling management center, wherein, the request for acquiring a floor in a trunking service contains a trunking session identity; and receiving a trunking context establishment request sent by the trunking scheduling management center, and interacting with the first base station and the second terminal to complete the establishment of the default bearer; wherein, the trunking context establishment request is sent after the trunking scheduling management center performs authentication, certification and policy decision on the second terminal after receiving the request for acquiring a floor in a trunking service.

16. The broadband trunking system according to claim 14, wherein:

the step of completing the establishment of the dedicated bearer by interacting with the first base station, and the SGW and the P-GW located in the same network subsystem in which the MME is located comprises:

receiving a request message, for seizing a dedicated floor in a trunking service, transparently transferred by the second terminal via the first base station;

interacting with the SGW and the P-GW to perform a bearer establishment of a user with a floor;

sending an establishment request, for establishing a dedicated bearer for seizing a floor in a trunking service, to the first base station; and receiving establishment completion message sent after the first base station completes configurations according to the establishment request for establishing a dedicated bearer for seizing a floor in a trunking service.

17. The broadband trunking system according to claim 14, wherein:

the step of completing updating a floor in a trunking service by interacting with the MBMS-GW, the SGW and the trunking scheduling management center and send the message, indicating a request for a floor in a trunking service is accepted, to the second terminal via the first base station comprises:

sending a request for updating a floor in a trunking service to the SGW, and receiving a update response message returned by the SGW;

sending a request for updating a floor in a trunking service to the trunking scheduling management center via the MBMS-GW, and receiving a message, indicating a request for updating a floor in a trunking service is accepted, returned by the trunking scheduling management center; and sending a message, indicating a request for a floor in a trunking service is accepted, to the second terminal via the first base station.

18. The broadband trunking system according to claim 14, wherein:

the step of completing the context modification for a floor in a trunking service by interacting with the first terminal and the second base station to which the first terminal belongs comprises:

sending a context modification request for a floor in a trunking service to the second base station;

releasing a bearer context of the first terminal with the second base station; and receiving a response message, for context modification for a floor in a trunking service, returned after the second base station releases a connection of the first terminal.

19. The broadband trunking system according to claim 11, wherein:

the MCE is further configured to: receive a trunking service session start request from a Mobile Management Entity (MME), generate scheduling control information of the radio resources according to a quality of service, and send the scheduling control information to the base stations.

20. The broadband trunking system according to claim 11, wherein:

the base stations are further configured to:

receive a context modification request for a floor in a trunking service sent by the MME, release a bearer context of a first terminal with the MME, perform Radio Resource Control (RRC) connection release with respect to the first terminal which the base stations serve, and return a response, for a context modification request for a floor in a trunking service to the MME; or receive an establishment request, for establishing a dedicated bearer for seizing a floor in a trunking service, sent by the MME, perform an establishment of RRC connection reconfiguration with a second terminal which the base stations serve, and return establishment completion message for the establishment request to the MME.

* * * * *